US008484443B2

(12) United States Patent
Gonion (10) Patent No.: US 8,484,443 B2
(45) Date of Patent: *Jul. 9, 2013

(54) RUNNING MULTIPLY-ACCUMULATE INSTRUCTIONS FOR PROCESSING VECTORS (75) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/463,454

(22) Filed: May 3, 2012

(65) Prior Publication Data

US 2012/0221837 A1    Aug. 30, 2012

Related U.S. Application Data (63) Continuation-in-part of application No. 13/188,737, filed on Jul. 22, 2011, and a continuation-in-part of application No. 12/541,546, filed on Aug. 14, 2009.

(60) Provisional application No. 61/089,251, filed on May 15, 2008.

(51) Int. Cl.
*G06F 7/00* (2006.01)

(52) U.S. Cl.
USPC .......................................... 712/222

(58) Field of Classification Search
None
See application file for complete search history.

(56) References Cited

U.S. PATENT DOCUMENTS

| 5,381,536 | A | | 1/1995 | Phelps |
| 5,781,752 | A | | 7/1998 | Moshovos |
| 5,953,241 | A | | 9/1999 | Hansen |
| 5,983,257 | A | * | 11/1999 | Dulong et al. ................ 708/603 |
| 6,115,808 | A | | 9/2000 | Arora |
| 6,295,599 | B1 | | 9/2001 | Hansen |
| 6,301,706 | B1 | * | 10/2001 | Maslennikov et al. ....... 717/160 |
| 6,308,250 | B1 | | 10/2001 | Klausler |
| 6,584,482 | B1 | | 6/2003 | Hansen |
| 6,643,765 | B1 | | 11/2003 | Hansen |
| 6,725,356 | B2 | | 4/2004 | Hansen |
| 7,213,131 | B2 | | 5/2007 | Hansen |

(Continued)

OTHER PUBLICATIONS

Sheffler (A Portable MPI-Based Parallel Vector Template Library); Research Institute for Advanced Computer Science—NASA Ames Research Center; RIACS Technical Report 95.04, Feb. 1995; 32 pages.*

(Continued)

*Primary Examiner* — Keith Vicary
(74) *Attorney, Agent, or Firm* — Park, Vaughan, Fleming & Dowler, LLP; Anthony P. Jones (57) ABSTRACT The described embodiments include RunningMAC1P and RunningMAC2P instructions. In the described embodiments, a processor receives a first input vector, a second input vector, a third input vector, and a control vector. Upon executing a RunningMAC1P or a RunningMAC2P instruction, the processor sets a base value equal to a value from an element at a key element position in the first input vector. Next, the processor generates the result vector by, for each element of the result vector to the right of the key element position, setting the element in the result vector equal to a sum of the base value and a result of multiplying a value in each relevant element of the second input vector by a value in a corresponding element of the third input vector, from an element at the key element position to and including a predetermined element in the second input vector.

24 Claims, 5 Drawing Sheets

U.S. PATENT DOCUMENTS

| | | |
|---|---|---|
| 7,216,217 B2 | 5/2007 | Hansen |
| 7,260,708 B2 | 8/2007 | Hansen |
| 7,301,541 B2 | 11/2007 | Hansen |
| 7,353,367 B2 | 4/2008 | Hansen |
| 7,430,655 B2 | 9/2008 | Hansen |
| 7,464,252 B2 | 12/2008 | Hansen |
| 7,509,366 B2 | 3/2009 | Hansen |
| 7,516,308 B2 | 4/2009 | Hansen |
| 7,653,806 B2 | 1/2010 | Hansen |
| 7,660,972 B2 | 2/2010 | Hansen |
| 7,660,973 B2 | 2/2010 | Hansen |
| 7,730,287 B2 | 6/2010 | Hansen |
| 2006/0004996 A1* | 1/2006 | Gonion .................. 712/241 |
| 2010/0274988 A1* | 10/2010 | Mimar .................. 712/5 |
| 2010/0274990 A1* | 10/2010 | Wilder et al. .......... 712/22 |

OTHER PUBLICATIONS

Young (NRL Connection Machine Fortran Library); Naval Research Laboratory; NRL Memorandum Report 6807; Apr. 16, 1991; 193 pages.*

Cray (Cray SVI Application Optimization Guide S-2312-36); Jun. 2002; 7 pages.*

* cited by examiner

RUNNING MULTIPLY-ACCUMULATE INSTRUCTIONS FOR PROCESSING VECTORS

RELATED APPLICATIONS

This application is a continuation in part of, and hereby claims priority under 35 U.S.C. §120 to, pending U.S. patent application Ser. No. 13/188,737, entitled "Running Subtract and Running Divide Instructions for Processing Vectors," by inventors Jeffry E. Gonion and Keith E. Diefendorff, filed 22 Jul. 2011. This application is also a continuation in part of, and hereby claims priority under 35 U.S.C. §120 to, pending U.S. patent application Ser. No. 12/541,546, entitled "Running-Shift Instructions for Processing Vectors," by inventors Jeffry E. Gonion and Keith E. Diefendorff, filed 14 Aug. 2009. This application further claims priority under 35 U.S.C. §120 to U.S. provisional patent application Ser. No. 61/089,251, entitled "Macroscalar Processor Architecture," by inventor Jeffry E. Gonion, filed 15 Aug. 2008, to which the parent applications Ser. Nos. 12/541,546 and 13/188,737 also claim priority. These applications are each herein incorporated by reference.

This application is related to: (1) pending application Ser. No. 12/419,629, entitled "Method and Apparatus for Executing Program Code," by inventors Jeffry E. Gonion and Keith E. Diefendorff, filed on 7 Apr. 2009; (2) pending application Ser. No. 12/419,644, entitled "Break, Pre-Break, and Remaining Instructions for Processing Vectors," by inventors Jeffry E. Gonion and Keith E. Diefendorff, filed on 7 Apr. 2009; (3) pending application Ser. No. 12/419,661, entitled "Check-Hazard Instructions for Processing Vectors," by inventors Jeffry E. Gonion and Keith E. Diefendorff, filed on 7 Apr. 2009; (4) pending application Ser. No. 12/495,656, entitled "Copy-Propagate, Propagate-Post, and Propagate-Prior Instructions For Processing Vectors," by inventors Jeffry E. Gonion and Keith E. Diefendorff, filed on 30 Jun. 2009; (5) pending application Ser. No. 12/495,643, entitled "Shift-In-Right Instructions for Processing Vectors," by inventors Jeffry E. Gonion and Keith E. Diefendorff, filed on 30 Jun. 2009; (6) pending application Ser. No. 12/495,631, entitled "Increment-Propagate and Decrement-Propagate Instructions for Processing Vectors," by inventors Jeffry E. Gonion and Keith E. Diefendorff, filed on 30 Jun. 2009; (7) pending application Ser. No. 12/541,505, entitled "Running-Sum Instructions for Processing Vectors," by inventors Jeffry E. Gonion and Keith E. Diefendorff, filed on 14 Aug. 2009; and (8) pending application Ser. No. 12/541,526, entitled "Running-AND, Running-OR, Running-XOR, and Running-Multiply Instructions for Processing Vectors" by inventors Jeffry E. Gonion and Keith E. Diefendorff, filed on 14 Aug. 2009.

This application is also related to: (1) pending application Ser. No. 12/873,043, entitled "Running-Min and Running-Max Instructions for Processing Vectors," by inventors Jeffry E. Gonion and Keith E. Diefendorff, filed 31 Aug. 2010; (2) pending application Ser. No. 12/873,063, entitled "Non-Faulting and First-Faulting Instructions for Processing Vectors," by inventors Jeffry E. Gonion and Keith E. Diefendorff, filed 31 Aug. 2010; (3) pending application Ser. No. 12/873,074, entitled "Vector Test Instruction for Processing Vectors" by inventors Jeffry E. Gonion and Keith E. Diefendorff, filed 31 Aug. 2010; (4) pending application Ser. No. 12/907,471, entitled "Select First and Select Last Instructions for Processing Vectors," by inventors Jeffry E. Gonion and Keith E. Diefendorff, filed 19 Oct. 2010; (5) pending application Ser. No. 12/907,490, entitled "Actual Instruction and Actual-Fault Instructions for Processing Vectors," by inventors Jeffry E. Gonion and Keith E. Diefendorff, filed 19 Oct. 2010; (6) pending application Ser. No. 12/977,333, entitled "Remaining Instruction for Processing Vectors," by inventors Jeffry E. Gonion and Keith E. Diefendorff, filed 23 Dec. 2010; (7) pending application Ser. No. 13/006,243, entitled "Remaining Instruction for Processing Vectors," by inventors Jeffry E. Gonion and Keith E. Diefendorff, filed 13 Jan. 2011; (8) pending application No. 13/189,140, entitled "GetFirst and AssignLast Instructions for Processing Vectors," by inventor Jeffry E. Gonion, filed 22 July 2011; (9) pending application Ser. No. 13/291,931, entitled "Vector Index Instruction for Processing Vectors," by inventor Jeffry E. Gonion and Keith E. Diefendorff, filed 8 Nov. 2011; (10) pending application Ser. No. 13/343,619, entitled "Predicate Count and Segment Count Instructions for Processing Vectors" by inventor Jeffry E. Gonion, filed on 4 Jan. 2012; and (11) pending application Ser. No. 13/414,606, entitled "Predicting Branches for Vector Partitioning Loops when Processing Vector Instructions" by inventor Jeffry E. Gonion, filed on 7 Mar. 2012.

This application is also related to: (1) pending application Ser. No. 12/237,212, entitled "Conditional Data-Dependency Resolution in Vector Processors," by inventors Jeffry E. Gonion and Keith E. Diefendorff, filed 24 Sep. 2008; (2) pending application Ser. No. 12/237,196, entitled "Generating Stop Indicators Based on Conditional Data Dependency in Vector Processors," by inventors Jeffry E. Gonion and Keith E. Diefendorff, filed 24 Sep. 2008; (3) pending application Ser. No. 12/237,190, entitled "Generating Predicate Values Based on Conditional Data Dependency in Vector Processors," by inventors Jeffry E. Gonion and Keith E. Diefendorff, filed 24 Sep. 2008; (4) application Ser. No. 11/803,576, entitled "Memory-Hazard Detection and Avoidance Instructions for Vector Processing," by inventors Jeffry E. Gonion and Keith E. Diefendorff, filed 14 May 2007, which has been issued as U.S. Pat. No. 8,019,976; and (5) pending application Ser. No. 13/224,170, entitled "Memory-Hazard Detection and Avoidance Instructions for Vector Processing," by inventors Jeffry E. Gonion and Keith E. Diefendorff, filed 14 May 2007.

BACKGROUND

1. Field

The described embodiments relate to techniques for improving the performance of computer systems. More specifically, the described embodiments relate to running multiply-accumulate instructions for processing vectors.

2. Related Art

Recent advances in processor design have led to the development of a number of different processor architectures. For example, processor designers have created superscalar processors that exploit instruction-level parallelism (ILP), multi-core processors that exploit thread-level parallelism (TLP), and vector processors that exploit data-level parallelism (DLP). Each of these processor architectures has unique advantages and disadvantages which have either encouraged or hampered the widespread adoption of the architecture. For example, because ILP processors can often operate on existing program code that has undergone only minor modifications, these processors have achieved widespread adoption. However, TLP and DLP processors typically require applications to be manually re-coded to gain the benefit of the parallelism that they offer, a process that requires extensive effort. Consequently, TLP and DLP processors have not gained widespread adoption for general-purpose applications.

One significant issue affecting the adoption of DLP processors is the vectorization of loops in program code. In a typical program, a large portion of execution time is spent in loops. Unfortunately, many of these loops have characteristics that render them unvectorizable in existing DLP processors. Thus, the performance benefits gained from attempting to vectorize program code can be limited.

One significant obstacle to vectorizing loops in program code in existing systems is dependencies between iterations of the loop. For example, loop-carried data dependencies and memory-address aliasing are two such dependencies. These dependencies can be identified by a compiler during the compiler's static analysis of program code, but they cannot be completely resolved until runtime data is available. Thus, because the compiler cannot conclusively determine that runtime dependencies will not be encountered, the compiler cannot vectorize the loop. Hence, because existing systems require that the compiler determine the extent of available parallelism during compilation, relatively little code can be vectorized.

SUMMARY

The described embodiments include a processor (e.g., processor 102 in FIG. 1) that generates a result vector upon executing a RunningMAC1P instruction or a RunningMAC2P instruction (or a RunningFMAC1P/2P instruction). In these embodiments, upon executing a RunningMAC1P/2P instruction (or a RunningFMAC1P/2P instruction), the processor receives a first input vector, a second input vector, a third input vector, and a control vector, wherein each vector includes N elements. The processor then sets a base value equal to a value from an element at a key element position in the first input vector. Next, the processor generates the result vector. When generating the result vector, for each element of the result vector to the right of the key element position, the processor sets the element in the result vector equal to a sum of the base value and a result of multiplying a value in each relevant element of the second input vector by a value in a corresponding element of the third input vector, from an element at the key element position to and including a predetermined element in the second input vector.

Note that the processor or may round a result for the multiplication for the RunningMAC1P/2P instruction before performing the summation, whereas the processor may not round the result of the multiplication before performing the summation for the RunningFMAC1P/2P instruction.

In some embodiments, the key element position is a first (e.g., leftmost, when a lowest-numbered element is the leftmost element) element position where the control vector is active and a relevant element is an element for which a corresponding element of the control vector is active.

In some embodiments (e.g., for the RunningMAC1P or the RunningFMAC1P instruction), the predetermined element in the second input vector is a first element in the second input vector to the left of an element in the second input vector at a same position as the element in the result vector.

In some embodiments (e.g., for the RunningMAC1P or the RunningFMAC1P instruction), when generating the result vector, the processor sets an element in the result vector at the key element position equal to the base value.

In some embodiments (e.g., for the RunningMAC2P or the RunningFMAC2P instruction), the predetermined element in the second input vector is an element in the second input vector at a same position as the element in the result vector.

In some embodiments (e.g., for the RunningMAC2P or the RunningFMAC2P instruction), when generating the result vector, the processor sets an element in the result vector at the key element position equal to a sum of the base value and a result of multiplying a value in the key element position in the second input vector by a value in a corresponding element of the third input vector.

In some embodiments, when generating the result vector, for each element of the result vector to the left of the key element position, the processor sets the element in the result vector equal to a value in a corresponding element in the first input vector. In these embodiments, when no key element position exists, the processor sets each element in the result vector equal to a value in a corresponding element in the first input vector.

BRIEF DESCRIPTION OF THE FIGURES

In the figures, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by an electronic device with computing capabilities. For example, the computer-readable storage medium can include volatile memory or non-volatile memory, such as flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), and/or other mediums capable of storing data structures or code. Note that in the described embodiments, the computer-readable storage medium does not include non-statutory computer-readable storage mediums such as transitory signals.

The methods and processes described in this detailed description can be included in one or more hardware modules. For example, the hardware modules can include, but are not limited to, processors, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When computer system (e.g., a processor in the computer system) reads and executes the code and/or data stored on the computer-readable storage medium, the computer system performs the methods and processes embodied as data structures and code and stored within the computer-readable storage medium.

In the following description, we refer to "some embodiments." Note that "some embodiments" describes a subset of all of the possible embodiments, but does not always necessarily specify the same subset of the embodiments.

Macroscalar Architecture

The embodiments described herein are based in part on the Macroscalar Architecture that is described in U.S. patent application Ser. No. 13/188,737, entitled "Running Subtract and Running Divide Instructions for Processing Vectors," by inventors Jeffry E. Gonion and Keith E. Diefendorff, filed 22 Jul. 2011(hereinafter "the '737 application"), the contents of which are (as described above) incorporated by reference.

As recited in the '737 application, the described embodiments provide an instruction set and supporting hardware that allow compilers to generate program code for loops without completely determining parallelism at compile-time, and without discarding useful static analysis information. Specifically, these embodiments provide a set of instructions that do not mandate parallelism for loops but instead enable parallelism to be exploited at runtime if dynamic conditions permit. These embodiments thus include instructions that enable code generated by the compiler to dynamically switch between non-parallel (scalar) and parallel (vector) execution for loop iterations depending on conditions at runtime by switching the amount of parallelism used.

These embodiments provide instructions that enable an undetermined amount of vector parallelism for loop iterations but do not require that the parallelism be used at runtime. More specifically, these embodiments include a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, the described embodiments execute the two elements in parallel. In these embodiments, expressing program code in a vector-length agnostic format enables a broad range of vectorization opportunities that are not present in existing systems.

In the described embodiments, during compilation, a compiler first analyzes the loop structure of a given loop in program code and performs static dependency analysis. The compiler then generates program code that retains static analysis information and instructs processor 102 how to resolve runtime dependencies and process the program code with the maximum amount of parallelism possible. More specifically, the compiler provides vector instructions for performing corresponding sets of loop iterations in parallel, and provides vector-control instructions for dynamically limiting the execution of the vector instructions to prevent data dependencies between the iterations of the loop from causing an error (which can be called "vector partitioning"). This approach defers the determination of parallelism to runtime, where the information on runtime dependencies is available, thereby allowing the software and processor to adapt parallelism to dynamically changing conditions (i.e., based on data that is not available at compile-time).

Vectorized program code can comprise vector-control instructions and vector instructions forming a loop in the vectorized program code that performs vector operations based on a corresponding loop in program code. The vector control instructions can determine iterations of the loop in program code that are safe to execute in parallel (because, e.g., no runtime data dependencies have occurred), and the vector instructions can be executed using predication and/or other dynamic controls to limit the elements of the vector instruction that are processed in parallel to the determined-safe iterations. (Recall that, in the described embodiments, each element of a vector instruction can perform an operation (or operations) for corresponding iterations of a loop in the program code.)

Terminology

Throughout the description, we use the following terminology. These terms may be generally known in the art, but are described below to clarify the subsequent descriptions.

The term "active" or "active element," as used in this description to refer to one or more elements of a vector, indicates elements that are operated on during a given operation. Generally, the described embodiments enable a vector execution unit to selectively perform operations on one or more available elements in a given vector in parallel. For example, an operation can be performed on only the first two of eight elements of the vector in parallel. In this case, the first two elements are "active elements," while the remaining six elements are "inactive elements." In the described embodiments, one or more other vectors can be used to determine which elements in a given operand vector are active (i.e., are to be operated on). For example, a "predicate vector" or "control vector" can include "active" elements that are used to determine which elements in the operand vector to perform operations on. In some embodiments, elements that contain data of a predetermined type are active elements (e.g., true, false, non-zero, zero, uppercase/lowercase characters, even/odd/prime numbers, vowels, whole numbers, etc.).

The terms "true" and "false" are used in this description to refer to data values (e.g., a data value contained in an element in a vector). Generally, in computer systems true and false are often represented by 1 and 0, respectively. In practice, a given embodiment could use any value to represent true and false, such as the number 55, or the letter "T."

In the following examples, "corresponding elements" are described. Generally, corresponding elements are elements at a same element position in two or more different vectors. For example, when a value is copied from an element in an input vector into a "corresponding element" of a result vector, the value is copied from an nth element in the input vector into an nth element in the result vector.

In the following examples, "relevant" elements are described. In the described embodiments, a relevant element is an element in a given vector for which the corresponding element in one or more other vectors (e.g., a control vector and/or predicate vector) is/are active. For example, given an input control vector for which only a fourth element is active, a second input vector only has one relevant element—the fourth element.

Notation

In describing the embodiments in the instant application, we use the following formats for variables, which are vector quantities unless otherwise noted:

*p5=a<b;*

Elements of vector p5 are set to 0 or 1 depending on the result of the comparison operation a<b. Note that vector p5 can be a predicate vector that can be used to control the number of elements of one or more vector instructions that execute in parallel.

*~p5; a=b+c;*

Only elements in vector a designated by active (i.e., non-zero) elements in the predicate vector p5 receive the result of b+c. The remaining elements of a are unchanged. This operation is called "predication," and is denoted using the tilde ("~") before the predicate vector.

*!p5; a=b+c;*

Only elements in vector a designated by active (e.g., non-zero) elements in the predicate vector p5 receive the result of b+c. The remaining elements of a are set to zero. This operation is called "zeroing," and is denoted using the exclamation point ("!") before the predicate vector.

if (FIRST( )) goto . . . ; Also LAST( ), ANY( ), ALL( ), CARRY( ), ABOVE( ), or NONE( ), (where ANY( )==!NONE( ))

These instructions test the processor status flags and branch accordingly.

*x+=VECLEN;*

VECLEN is a value that communicates the number of elements per vector. The value is determined at runtime by the processor 102 (see FIG. 1), rather than being determined by the compiler/assembler.

// Comment

In a similar way to many common programming languages, the examples presented below use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors discussed herein are vectors of integers, but alternative embodiments support other data formats.

Instruction Definitions

The described embodiments comprise a RunningMAC1P instruction (where "MAC" is an abbreviation for "multiply accumulate") and a RunningMAC2P instruction. Generally, when executed, the RunningMAC1P/2P instructions generate a result vector with results of a running multiply-accumulate operation. Specifically, given a first input vector, a second input vector, a third input vector, and a control vector, the RunningMAC1P/2P instructions determine a base value from a key element in the first input vector (the position of the key element, or the "key element position" can be at a same position as a position of a leftmost active element in the control vector). The RunningMAC1P/2P instructions then set each element to the right of the key element position in the result vector equal to a sum of the base value and the results of multiplying the value in each relevant element of the second input vector by the value in the corresponding element of the third input vector, from an element at the key element position to and including a predetermined element in the second input vector (relevant elements are elements for which a corresponding element of the control vector is active, and the predetermined element, which differs for the 1P and 2P variants of the RunningMAC1P/2P instructions, is described in more detail below). In addition, the RunningMAC1P instruction sets the element in the key element position of the result vector equal to the base value, and the RunningMAC2P instruction sets the element in the key element position of the result vector equal to a sum of the base value and a result of multiplying a value in the key element position in the second input vector by a value in a corresponding element of the third input vector. The RunningMAC1P /2P instructions also set elements to the left of the key element position in the result vector equal to a value in a corresponding element in the first input vector.

Some embodiments also comprise RunningFMAC1P and RunningFMAC2P instructions (where "FMAC" is an abbreviation for "fused multiply accumulate"). A distinction between RunningFMAC1P/2P and RunningMAC1P/2P is the precision of intermediate results used in the summation. Specifically, the RunningFMAC1P/2P instructions may not round the results of the multiplication prior to the summation, whereas the RunningMAC1P/2 P instructions may round the results of the multiplication prior to the summation.

Although certain arrangements of instructions are used in describing the RunningMAC1P and RunningMAC2P instructions, a person of skill in the art will recognize that these concepts may be implemented using different arrangements or types of instructions without departing from the spirit of the described embodiments. Additionally, the RunningMAC1P/2P instructions are described using a signed-integer data type. However, in alternative embodiments, other data types or formats are used. Moreover, although Macroscalar instructions may take vector, scalar, or immediate arguments in practice, vector arguments are described herein.

For the purposes of explanation, the vector data type is defined as a C++ class containing an array v[ ] of elements that comprise the vector. Within these descriptions, the variable VECLEN indicates the size of the vector. In some embodiments, VECLEN is constant.

Note that the format of the following instruction definitions is a statement of the instruction type followed by a description of the instruction that can include example code as well as one or more usage examples.

RunningMAC1P

Using the value of the first/leftmost active element in a first input vector a (i.e., the key element in a) as a basis/base value, the RunningMAC1P adds the cumulative results of multiplying active elements of a second input vector b and a third input vector c to the basis/base value and writes results of the addition to corresponding elements of a result vector. Control/predicate vector p determines which elements participate in the accumulation of addends (i.e., indicates which elements are active/relevant). Inactive elements prior to the first active element of the first input vector a are copied into corresponding elements of the result vector. Note that the RunningMAC1P instruction stores the values prior to being added into the result vector. In some embodiments, the RunningMAC1P uses the result vector as one of its inputs.

```
vector RunningMAC1P(vector a, vector b, vector c,
vector p)
{
    vector r;
    int s=0,x;
    for (x=0; x<VECLEN; ++x)
    {
        if (p.v[x])
        {
            s = a.v[x];
            break;
        }
        else
            r.v[x] = a.v[x];
    }
    for (; x<VECLEN; ++x)
    {
        r.v[x] = s;
        if (p.v[x])
            s += b.v[x] * c.v[x]; // MAC Operation
    }
    return(r);
}
```

EXAMPLES r=RunningMAC1P(a, b, c, p);
On Entry:
a={1 1 2 2 2 4 5 1}
b={1 2 2 1 2 2 2 2}
c={2 3 1 2 3 2 2 9}
p={0 0 1 1 0 1 1 0}
On Exit: r={1 1 2 4 6 6 10 14}
RunningMAC2P Using the value of the first/leftmost active element in a first input vector a (i.e., the key element in a) as a basis/base value, the RunningMAC2P adds the cumulative results of multiplying active elements of a second input vector b and a third input vector c to the basis/base value and writes results of the addition to corresponding elements of a result vector. Control/predicate vector p determines which elements participate in the accumulation of addends (i.e., indicates which elements are active/relevant). Inactive elements prior to the first active element of the first input vector a are copied into corresponding elements of the result vector. Note that the RunningMAC2P instruction stores the values after being added into the result vector. In some embodiments, the RunningMAC2P uses the result vector as one of its inputs.

```
vector RunningMAC2P(vector a, vector b, vector c,
vector p)
{
    vector r;
    int s=0,x;
    for (x=0; x<VECLEN; ++x)
    {
        if (p.v[x])
        {
            s = a.v[x];
            break;
        }
        else
            r.v[x] = a.v[x];
    }
    for (; x<VECLEN; ++x)
    {
        if (p.v[x])
            s += b.v[x] * c.v[x]; // MAC Operation
        r.v[x] = s;
```
-continued
```
    }
    return(r);
}
```

EXAMPLES r=RunningMAC2P(a, b, c, p);
On Entry: a={1 1 2 2 2 4 5 1}
b={1 2 2 1 2 2 2 2}
c={2 3 1 2 3 2 2 9}
p={0 0 1 1 0 1 1 0}
On Exit: r={1 1 4 6 6 10 14 14}
RunningFMAC1P/2P The RunningFMAC1P/2P instructions perform similar operations to the above-described RunningMAC1P/2P instructions. However, as described above, processor 102 may not round the results of the multiplication prior to the summation for the RunningFMAC1P/2P instructions, and processor 102 may round the results of the multiplication prior to the summation for the RunningMAC1P/2P instructions.

Computer System

Figure 1:
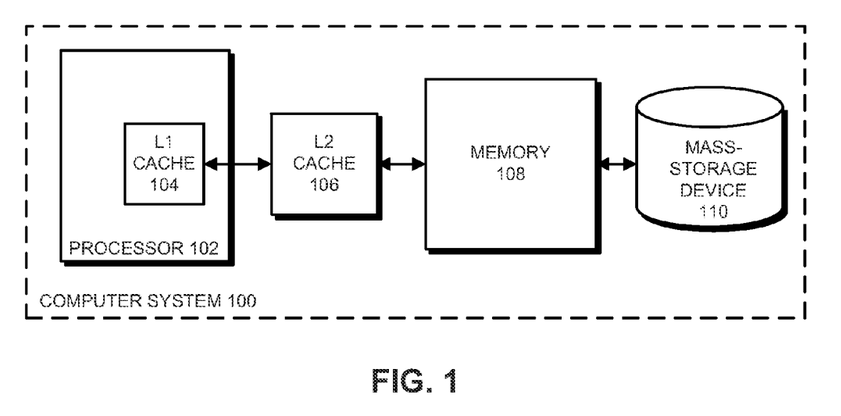
FIG. 1 presents a block diagram of a computer system in accordance with the described embodiments.

FIG. 1 presents a block diagram of a computer system 100 in accordance with the described embodiments. Computer system 100 includes processor 102, L2 cache 106, memory 108, and mass-storage device 110. Processor 102 includes L1 cache 104.

Processor 102 can be a general-purpose processor that performs computational operations. For example, processor 102 can be a central processing unit (CPU) such as a microprocessor, a controller, an application-specific integrated circuit (ASIC), or a field-programmable gate array (FPGA). In the described embodiments, processor 102 has one or more mechanisms for vector processing (i.e., vector execution units).

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments, L2 cache 106, memory 108, and mass-storage device 110 are shared between one or more processors in computer system 100. Such memory structures are well-known in the art and are therefore not described in more detail.

In some embodiments, the devices in the memory hierarchy (i.e., L1 cache 104, etc.) can access (i.e., read and/or write) multiple cache lines per cycle. These embodiments enable more effective processing of memory accesses that occur based on a vector of pointers or array indices to non-contiguous memory addresses. In addition, in some embodiments, the caches in the memory hierarchy are divided into a number of separate banks, each of which can be accessed in parallel. Banks within caches and parallel accesses of the banks are known in the art and hence are not described in more detail.

Computer system 100 can be incorporated into many different types of electronic devices. For example, computer system 100 can be part of a desktop computer, a laptop computer, a tablet computer, a server, a media player, an appliance, a cellular phone, a piece of testing equipment, a network appliance, a personal digital assistant (PDA), a hybrid device (i.e., a "smart phone"), or another electronic device.

Although we use specific components to describe computer system 100, in alternative embodiments, different components may be present in computer system 100. For example, computer system 100 may not include some of the memory hierarchy (e.g., memory 108 and/or mass-storage device 110). Alternatively, computer system 100 may include video cards, video-capture devices, user-interface devices, network cards, optical drives, and/or other peripheral devices that are coupled to processor 102 using a bus, a network, or another suitable communication channel. Computer system 100 may also include one or more additional processors, wherein the processors share some or all of L2 cache 106, memory 108, and mass-storage device 110.

Processor

Figure 2:
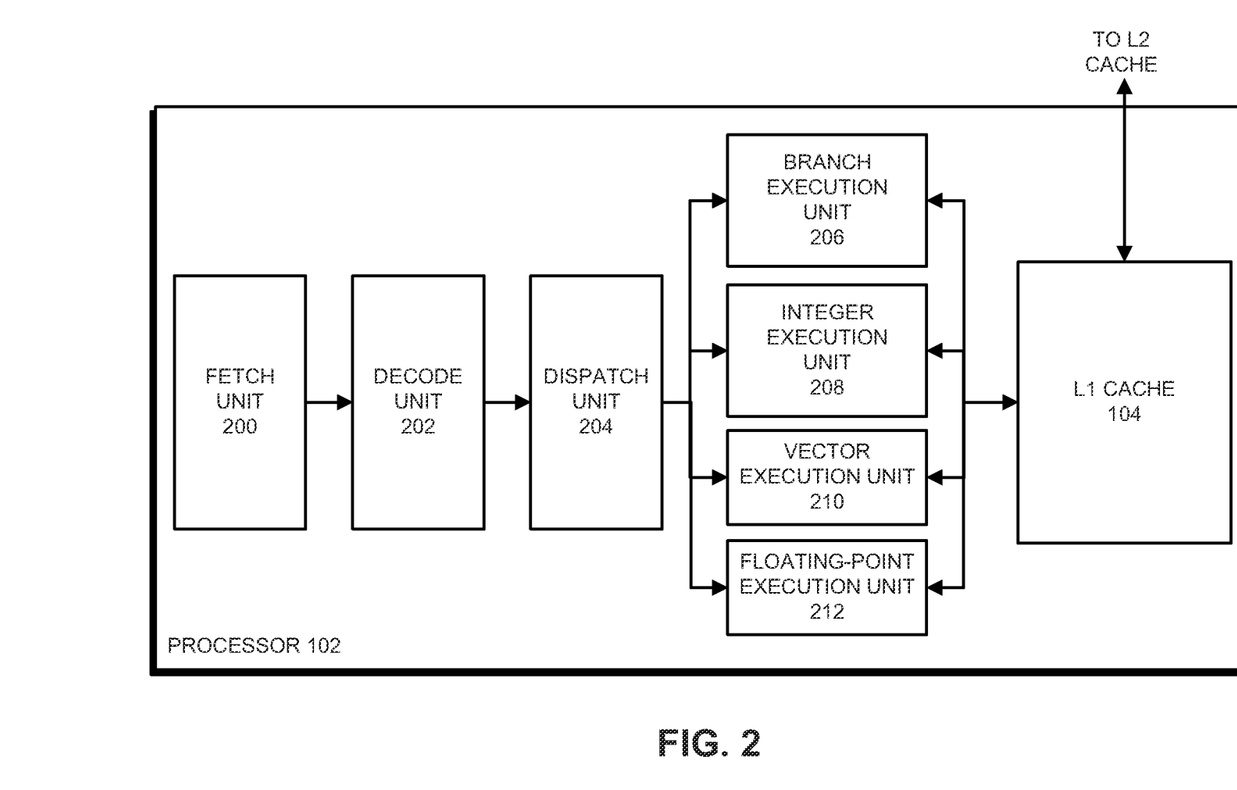
FIG. 2 presents an expanded view of a processor in accordance with the described embodiments.

FIG. 2 presents an expanded view of processor 102 in accordance with the described embodiments. As shown in FIG. 2, processor 102 includes L1 cache 104, fetch unit 200, decode unit 202, dispatch unit 204, branch execution unit 206, integer execution unit 208, vector execution unit 210, and floating-point execution unit 212 (branch execution unit 206, integer execution unit 208, vector execution unit 210, and floating-point execution unit 212 as a group are interchangeably referred to as "the execution units").

Fetch unit 200 fetches instructions from the memory hierarchy in computer system 100 and forwards the fetched instructions to be decoded in decode unit 202 for eventual execution in the execution units. Generally, fetch unit 200 attempts to fetch instructions from the closest portion of the memory hierarchy first, and if the instruction is not found at that level of the memory hierarchy, proceeds to the next level in the memory hierarchy until the instruction is found. For example, in some embodiments, fetch unit can request instructions from L1 cache 104 (which can comprise a single physical cache for instructions and data, or can comprise physically separate instruction and data caches). Aside from the operations herein described, the operations of fetch units are generally known in the art and hence are not described in more detail.

Decode unit 202 decodes the instructions and assembles executable instructions to be sent to the execution units, and dispatch unit 204 receives decoded instructions from decode unit 202 and dispatches the decoded instructions to the appropriate execution unit. For example, dispatch unit 204 can dispatch branch instructions to branch execution unit 206, integer instructions to integer execution unit 208, etc.

Each of execution units 206-212 is used for performing computational operations, such as logical operations, mathematical operations, or bitwise operations for an associated type of operand or operation. More specifically, integer execution unit 208 is used for performing computational operations that involve integer operands, floating-point execution unit 212 is used for performing computational operations that involve floating-point operands, vector execution unit 210 is used for performing computational operations that involve vector operands, and branch execution unit 206 is used for performing operations for resolving branches. Integer execution units, branch execution units, and floating-point execution units are generally known in the art and are not described in detail.

Figure 3:
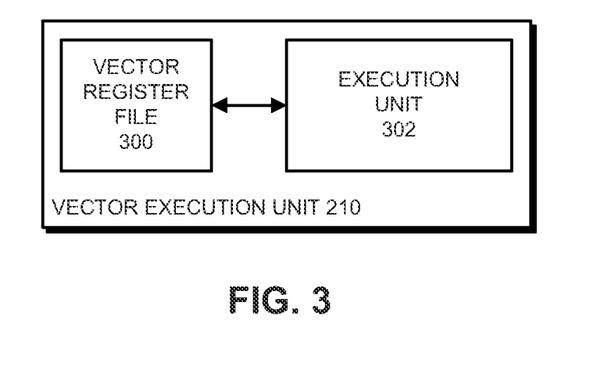
FIG. 3 presents an expanded view of a vector execution unit in accordance with the described embodiments.

In the described embodiments, vector execution unit 210 is a single-instruction-multiple-data (SIMD) execution unit that performs operations in parallel on some or all of the data elements that are included in vectors of operands. FIG. 3 presents an expanded view of vector execution unit 210 in accordance with the described embodiments. As is shown in FIG. 3, vector execution unit 210 includes a vector register file 300 and an execution unit 302. Vector register file 300 includes a set of vector registers that can hold operand vectors and result vectors for execution unit 302. In some embodiments, there are 32 vector registers in the vector register file, and each register includes 128 bits. In alternative embodiments, there are different numbers of vector registers and/or different numbers of bits per register.

Vector execution unit 302 retrieves operands from registers in vector register file 300 and executes vector instructions that cause execution unit 302 to perform operations in parallel on some or all of the data elements (or, simply, "elements") in the operand vector. For example, execution unit 302 can perform logical operations, mathematical operations, or bitwise operations on the elements in the vector. Execution unit 302 can perform one vector operation per cycle (although the "cycle" may include more than one cycle of a clock used to trigger, synchronize, and/or control execution unit 302's computational operations).

In the described embodiments, execution unit 302 supports vectors that hold N data elements (e.g., bytes, words, doublewords, etc.). In these embodiments, execution unit 302 can perform operations on N or fewer of the data elements in an operand vector in parallel. For example, assuming an embodiment where the vector is 256 bits in length (i.e., 32 bytes), the data elements being operated on are four-byte words, and the operation is adding a value to the data elements, these embodiments can add the value to any number of the eight words in the vector.

In the described embodiments, execution unit 302 includes at least one control signal that enables the dynamic limitation of the data elements in an operand vector on which execution unit 302 operates. Specifically, depending on the state of the control signal, execution unit 302 may or may not operate on all the data elements in the vector. For example, assuming an embodiment where the vector is 512 bits in length and the data elements being operated on are four-byte words, the control signal can be asserted to prevent operations from being performed on some or all of 16 data words in the operand vector. Note that "dynamically" limiting the data elements in the operand vector upon which operations are performed can involve asserting the control signal separately for each cycle at runtime.

In some embodiments, based on the values contained in a vector of predicates or one or more scalar predicates, execution unit 302 applies vector operations to selected vector data elements only. In some embodiments, the remaining data elements in a result vector remain unaffected (which we call "predication") or are forced to zero (which we call "zeroing"). In some of these embodiments, the clocks for the data element processing subsystems ("lanes") that are unused due to predication or zeroing in execution unit 302 can be gated, thereby reducing dynamic power consumption in execution unit 302.

The described embodiments are vector-length agnostic. Thus, a compiler or programmer need not have explicit knowledge of the vector length supported by the underlying hardware (e.g., vector execution unit 302). In these embodiments, a compiler generates or a programmer writes program code that need not rely on (or use) a specific vector length (some embodiments are forbidden from even specifying a specific vector size in program code). Thus, the compiled code in these embodiments (i.e., binary code) runs on other embodiments with differing vector lengths, while potentially realizing performance gains from processors that support longer vectors. Consequently, as process technology allows longer vectors, execution of legacy binary code simply speeds up without any effort by software developers.

In some embodiments, vector lengths need not be powers of two. Specifically, vectors of 3, 7, or another number of data elements can be used in the same way as vectors with power-of-two numbers of data elements.

In the described embodiments, each data element in the vector can contain an address that is used by execution unit 302 for performing a set of memory accesses in parallel. In these embodiments, if one or more elements of the vector contain invalid memory addresses, invalid memory-read operations can occur. In these embodiments, invalid memory-read operations that would otherwise result in program termination instead cause any elements with valid addresses to be read and elements with invalid elements to be flagged, allowing program execution to continue in the face of speculative, and in hindsight illegal, read operations.

In some embodiments, processor 102 (and hence execution unit 302) is able to operate on and use vectors of pointers. In these embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

Although we describe processor 102 as including a particular set of units, in alternative embodiments, processor 102 can include different numbers or types of units. In addition, although vector execution unit 210 is described using particular mechanisms, alternative embodiments may include different mechanisms. Generally, vector execution unit 210 (and, more broadly, processor 102) comprises sufficient mechanisms to perform vector operations, including the operations herein described.

Executing Program Code

Figure 4:
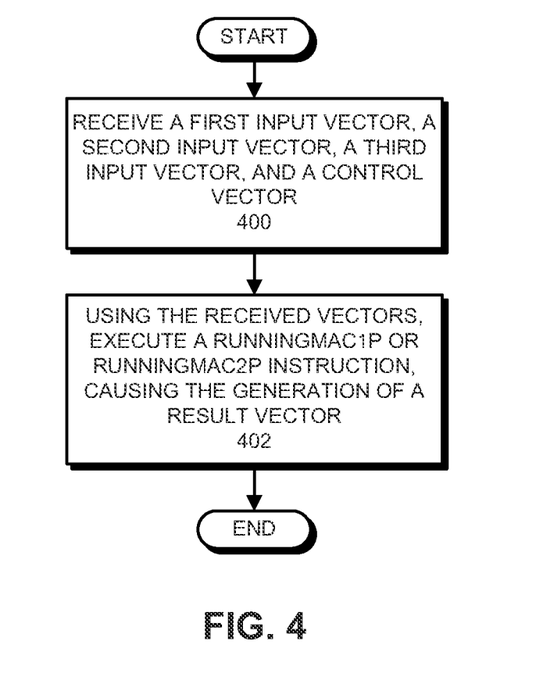
FIG. 4 presents a flowchart illustrating a process for executing program code in accordance with the described embodiments.

FIG. 4 presents a flowchart illustrating a process for executing program code in accordance with the described embodiments. As can be seen in FIG. 4, when executing program code, processor 102 receives a first input vector, a second input vector, a third input vector, and a control vector that each include N elements (step 400). Next, using the received vectors, processor 102 executes a RunningMAC1P or a RunningMAC2P instruction, which causes processor 102 to generate a result vector (step 402).

In some embodiments, when generating the result vector, processor 102 performs some or all of a set of operations for generating the result vector in parallel (e.g., using vector execution unit 210). Hence, in these embodiments, the values to be written to the result vector can be determined in parallel for all the elements of the result vector and written to the elements of the result vector in parallel. However, in alternative embodiments, one or more of the operations for generating the result vector can be performed in series with other operations for generating the result vector.

In the following examples, zero and non-zero values are used to describe the configuration of vectors and the performance of operations, however, in different embodiments, other values can be used. In addition, although "left" and "right" directions are used to describe elements in vectors when performing operations, in alternative embodiments, the directions could be reversed.

In the following examples, "corresponding elements" are described. Corresponding elements are generally elements at the same element position in two or more different vectors. For example, when a value is copied from an element in an input vector into a corresponding element of the result vector, the value is copied from an nth element in the input vector into an nth element in the result vector. In addition, "relevant" elements are described. In the described embodiments, a relevant element is an element in a given vector for which the corresponding element in the control vector is active (e.g., contains a non-zero value).

RunningMAC1P

Figure 5:
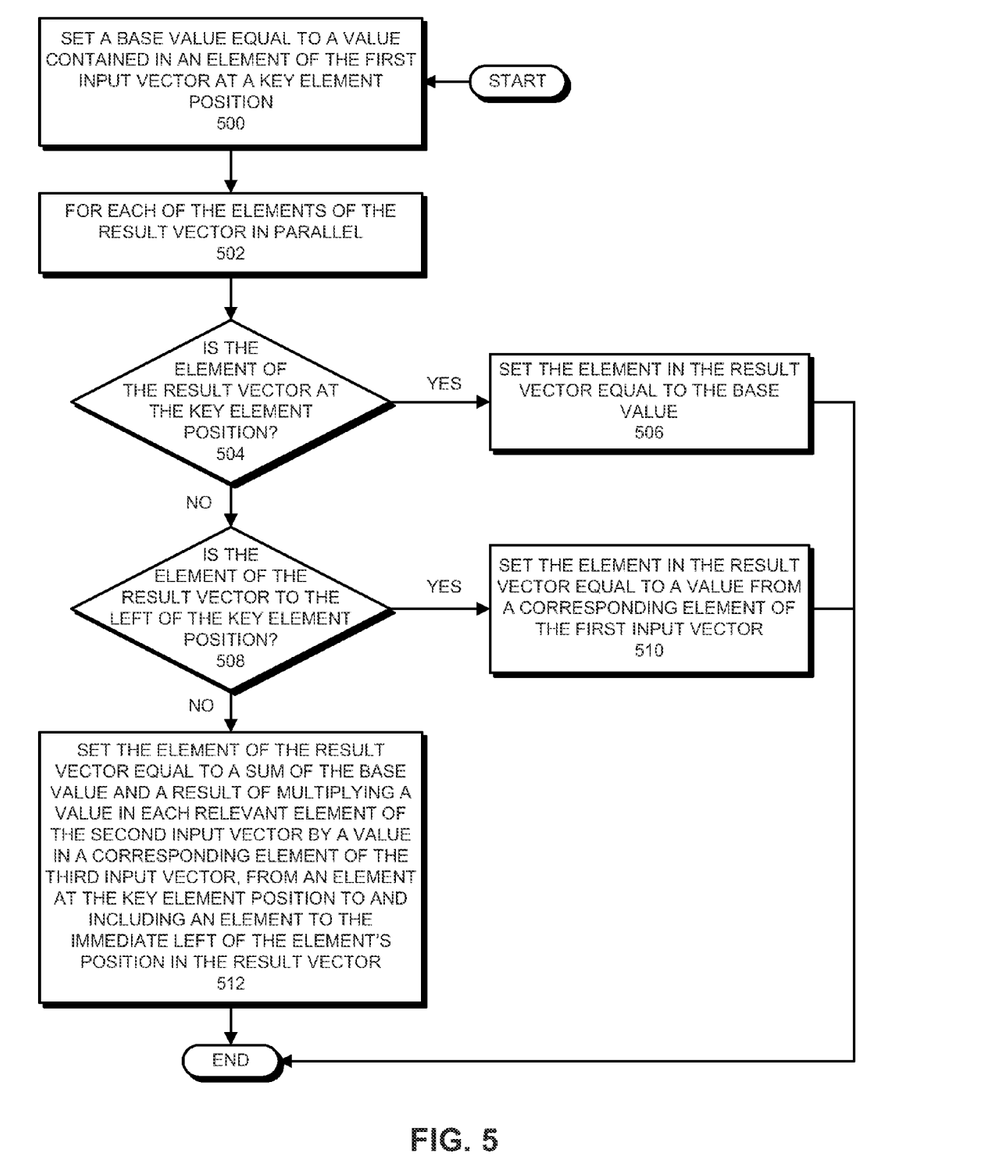
FIG. 5 presents a flowchart illustrating a process for executing a RunningMAC1P instruction in accordance with the described embodiments.

FIG. 5 presents a flowchart illustrating a process for executing a RunningMAC1P instruction in accordance with the described embodiments. In these embodiments, the operations shown in FIG. 5 are performed as part of step 402 in FIG. 4. Thus, for the purposes of describing the operations shown in FIG. 5, it is assumed that the first input vector, the second input vector, the third input vector, and the control vector have all been received, as shown in step 400 in FIG. 4.

As shown in FIG. 5, processor 102 first sets a base value equal to a value contained in an element of the first input vector at a key element position (step 500). In some embodiments, the key element position is the leftmost element position where the control vector contains a non-zero value. For example, assuming a control vector cv and a first input vector a contain the values shown, the key element position is located at the third element, and the base value is set to 2:

a={1 1 2 2 2 4 5 1}
cv={0 0 1 1 0 1 1 0}

Note that the key element position does not indicate any element in a particular vector, but instead indicates a location of an element that can apply to any of the vectors. Thus, in this description, "the key element" of different vectors may be referred to, and indicates an element at the key element position of that vector. Additionally, in alternative embodiments, the key element position is at a different location and, as described below, a key element position may not exist in the given vectors. Moreover, in some embodiments, the control vector is a predicate vector, which may have been generated in an earlier operation (e.g., may have been generated and/or updated by one or more control instructions).

Processor 102 then processes each of the elements of the result vector in parallel as follows (step 502). Specifically, for each of the elements in the result vector in parallel, processor 102 makes the determinations in steps 504 and/or 508, and sets the element of the result vector in accordance with the appropriate step 506, 510, or 512.

Processor 102 next determines if the element in the result vector is at the key element position in the result vector (step 504). If so, processor 102 sets the element in the result vector equal to the base value (step 506). For example, assuming a and cv contain the values shown, the result vector, res, could be generated as follows:

a={1 1 2 2 2 4 5 1}
cv={0 0 1 1 0 1 1 0}
res={X X 2 X X X X X}

This example shows an exemplary element in the key element position (i.e., a leftmost element where cv contains a non-zero value) for which the base value from a has been copied to res.

For clarity, other elements in res are marked with X. Note that a key element position may not exist (i.e., there may be no element position where cv contains a non-zero value). In this case, each element in the result vector is set equal to the corresponding element in the first input vector, as is described below with respect to steps 508-510.

If the element in the result vector is not at the key element position, processor 102 determines if the element in the result vector is located to the left of the key element position in the result vector (step 508). If so, processor 102 sets the element in the result vector equal to a value from a corresponding element in the first input vector (step 510). For example, assuming a and cv contain the values shown, res could be generated as follows:

a={1 1 2 2 2 4 5 1}
cv={0 0 1 1 0 1 1 0}
res={1 1 X X X X X X}

This example shows elements to the left of the key element position for which a value from the first input vector a has been copied to res. For clarity, other elements in res are marked with an X. As described above, there may be no element position in the control vector that contains a non-zero value, and hence no key element position. If this case occurs, the values from a are simply copied to each corresponding element in res.

If the element in the result vector is not located to the left of the key element position (step 508) (and hence is located to the right of the key element position), processor 102 sets the element in the result vector equal to a sum of the base value and a result of multiplying a value in each relevant element of the second input vector by a value in a corresponding element of the third input vector, from an element at the key element position of the second input vector to and including an element in the second input vector to the immediate left of the element's position in the result vector (step 512). For example, assuming the first input vector a, a second input vector b, a third input vector c, and control vector cv contain the values shown, res could be generated as follows:

a={1 1 2 2 2 4 5 1}
b={1 2 2 1 2 2 2 2}
c={2 3 1 2 3 2 2 9}
cv={0 0 1 1 0 1 1 0}
res={X X X 4 6 6 10 14}

As this example shows, for each of the elements in res to the right of the key element position, processor 102 determines the relevant elements at or to the right of the key element position that are also to the left of the element position in the result vector (recall that relevant elements are elements for which the control vector is active). Processor 102 then sets the element in the result vector equal to a sum of the base value and a result of multiplying a value in each of the relevant elements of the second input vector b by a value in a corresponding element of the third input vector c.

For example, for the fourth element in res, processor 102 determines that there is 1 relevant element to the left of the fourth element in res (the third element). Processor 102 then determines that the value in the third element of the second input vector b is 1 and the value in the third element of the third input vector c is 2. Processor 102 next multiplies the values from the elements of the second and third input vectors (2*1=2) and adds the result of the multiplication operation to the base value to arrive at a value (2+2=4) that is written into the fourth element in res.

As a second example, for the fifth element of res, processor 102 determines that there are 2 relevant elements to the left of the fifth element in res (the third element and the fourth element). Processor 102 then determines the values at the third and fourth elements of the second and third input vectors, which are 2, 1 and 1, 2. Processor 102 next multiplies the values from the elements of the second and third input vectors (2*1=2 and 1*2=2) and adds the result of the multiplication operation to the base value to arrive at a value (2+2+2=6) that is written into the fifth element in res.

The remaining elements are handled by processor 102 in the same way. Note that the value of 6 is written to both the fifth and sixth elements of the result vector; this is the "running" effect of the instruction. The value being set in this way reflects the fact that the fifth element of the vectors is not a relevant element (i.e., the fifth element of the control vector is set to zero) and so the fifth element is not used in the multiplication and summation operations for the RunningMAC1P instruction. For clarity, elements that are not written to during this operation are marked with an X in res.

In some embodiments, the call of the RunningMAC1P instruction is accompanied by a global predicate vector that may control the writing of the result into the result vector. In these embodiments, if the call to the RunningMAC1P instruction indicates that zeroing is to be used, for elements of the result vector where the predicate vector is inactive (e.g., is set to zero), the elements may be set to zero. Otherwise, if the call to the RunningMAC1P instruction indicates that predication is to be used, for elements of the result vector where the predicate vector is inactive (e.g., is set to zero), the elements may be left unchanged (i.e., whatever value was in such an element of the result vector is not overwritten with a new value).

RunningMAC2P

Figure 6:
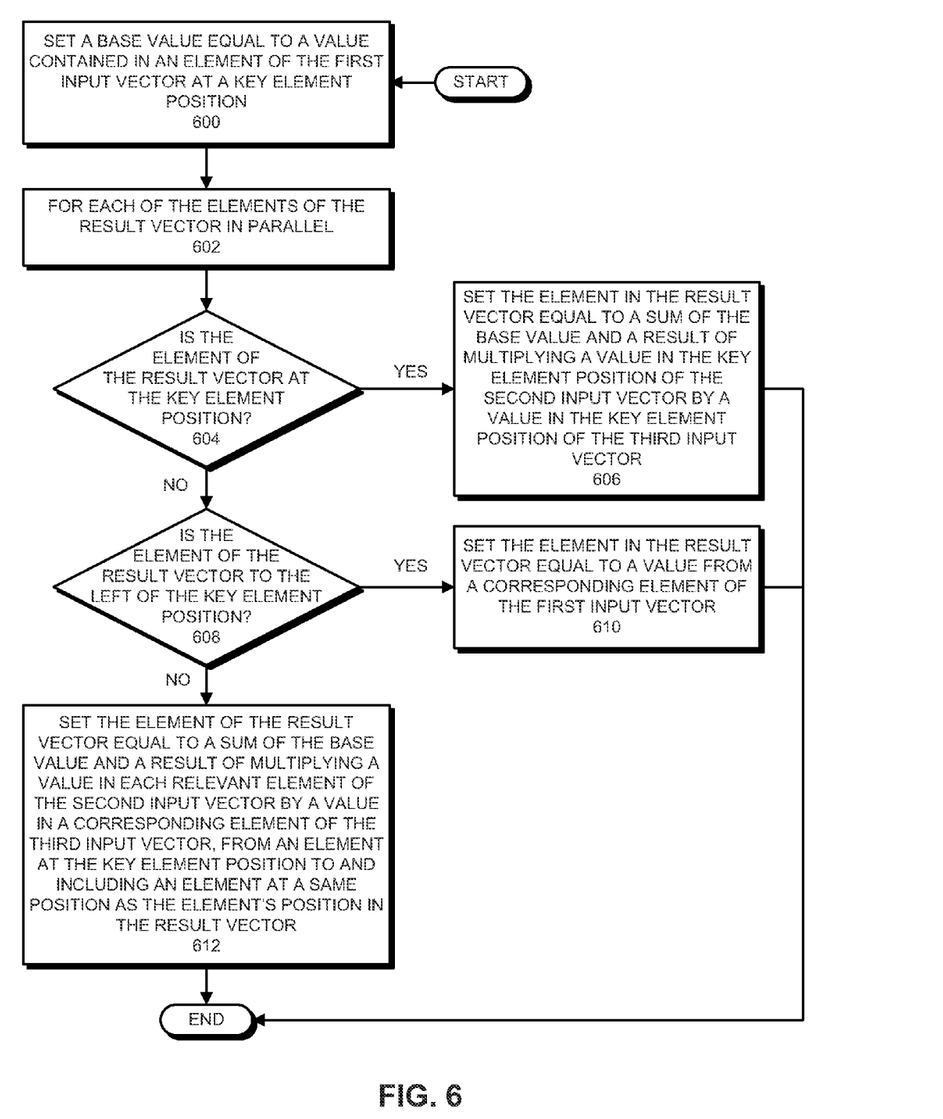
FIG. 6 presents a flowchart illustrating a process for executing a RunningMAC2P instruction in accordance with the described embodiments.

FIG. 6 presents a flowchart illustrating a process for executing a RunningMAC2P instruction in accordance with the described embodiments. In these embodiments, the operations shown in FIG. 6 are performed as part of step 402 in FIG. 4. Thus, for the purposes of describing the operations shown in FIG. 6, it is assumed that the first input vector, the second input vector, the third input vector, and the control vector have all been received, as shown in step 400 in FIG. 4.

As shown in FIG. 6, processor 102 first sets a base value equal to a value contained in an element of the first input vector at a key element position (step 600). In some embodiments, the key element position is the leftmost element position where the control vector contains a non-zero value. For example, assuming a control vector cv and a first input vector a contain the values shown, the key element position is located at the third element, and the base value is set to 2:

a={1 1 2 2 2 4 5 1}
cv={0 0 1 1 0 1 1 0}

Note that the key element position does not indicate any element in a particular vector, but instead indicates a location of an element that can apply to any of the vectors. Thus, in this description, "the key element" of different vectors may be referred to, and indicates an element at the key element position of that vector. Additionally, in alternative embodiments, the key element position is at a different location and, as described below, a key element position may not exist in the given vectors. Moreover, in some embodiments, the control vector is a predicate vector, which may have been generated in an earlier operation (e.g., may have been generated and/or updated by one or more control instructions).

Processor 102 then processes each of the elements of the result vector in parallel as follows (step 602). Specifically, for each of the elements in the result vector in parallel, processor 102 makes the determinations in steps 604 and/or 608, and sets the element of the result vector in accordance with the appropriate step 606, 610, or 612.

Processor 102 next determines if the element in the result vector is at the key element position in the result vector (step 604). If so, processor 102 sets the element in the result vector equal to a sum of the base value and a result of multiplying a value in the key element of the second input vector by a value in the key element of the third input vector (step 606). For example, assuming the first input vector a, a second input vector b, a third input vector c, and cv contain the values shown, the result vector, res, could be generated as follows:

a={1 1 2 2 2 4 5 1}
b={1 2 2 1 2 2 2 2}
c={2 3 1 2 3 2 2 9}
cv={0 0 1 1 0 1 1 0}
res={X X 4 X X X X X}

This example shows an exemplary element in the key element position (i.e., a leftmost element where cv contains a non-zero value) where the sum of the base value (2) with a result of multiplying the values from the key elements of the second input vector b and third input vector c (2*1=2) has been written to res (2+2=4). For clarity, other elements in res are marked with X. Note that a key element position may not exist (i.e., there may be no element position where cv contains a non-zero value). In this case, each element in the result vector is set equal to the corresponding element in the first input vector, as is described below with respect to steps 608-610.

If the element in the result vector is not at the key element position, processor 102 determines if the element in the result vector is located to the left of the key element position in the result vector (step 608). If so, processor 102 sets the element in the result vector equal to a value from a corresponding element in the first input vector (step 610). For example, assuming a and cv contain the values shown, res could be generated as follows:

a={1 1 2 2 2 4 5 1}
cv={0 0 1 1 0 1 1 0}
res={1 1 X X X X X X}

This example shows elements to the left of the key element position for which a value from the first input vector a has been copied to res. For clarity, other elements in res are marked with an X. As described above, there may be no element position in the control vector that contains a non-zero value, and hence no key element position. If this case occurs, the values from a are simply copied to each corresponding element in res.

If the element in the result vector is not located to the left of the key element position (step 608) (and hence is located to the right of the key element position), processor 102 sets the element in the result vector equal to a sum of the base value and a result of multiplying a value in each relevant element of the second input vector by a value in a corresponding element of the third input vector, from an element at the key element position of the second input vector to and including the element in the second input vector at the same position as the element's position in the result vector (step 612). For example, assuming the first input vector a, a second input vector b, a third input vector c, and control vector cv contain the values shown, res could be generated as follows:

a={1 1 2 2 2 4 5 1}
b={1 2 2 1 2 2 2 2}
c={2 3 1 2 3 2 2 9}
cv={0 0 1 1 0 1 1 0}
res={X X X 6 6 10 14 14}

As this example shows, for each of the elements in res to the right of the key element position, processor 102 determines the relevant elements from an element at the key element position of the second input vector to and including the element in the second input vector at the same position as the element's position in the result vector (recall that relevant elements are elements for which the control vector is active). Processor 102 then sets the element in the result vector equal to a sum of the base value and a result of multiplying a value in each of the relevant elements of the second input vector b by a value in a corresponding element of the third input vector c.

For example, for the fourth element in res, processor 102 determines that there are 2 relevant elements at or to the left of the fourth element in res (the third and fourth elements). Processor 102 then determines the values at the third and fourth elements of the second and third input vectors, which are 2, 1 and 1, 2. Processor 102 next multiplies the values from the elements of the second and third input vectors (2*1=2 and 1*2=2) and adds the result of the multiplication operation to the base value to arrive at a value (2+2+2=6) that is written into the fourth element in res.

As a second example, for the sixth element of res, processor 102 determines that there are 3 relevant elements at or to the left of the sixth element in res (the third, fourth, and sixth elements). Processor 102 then determines the values at the third, fourth, and sixth elements of the second and third input vectors, which are 2, 1, 2 and 1, 2, 2. Processor 102 next multiplies the values from the elements of the second and third input vectors (2*1=2, 1*2=2, and 2*2=4) and adds the result of the multiplication operation to the base value to arrive at a value (2+2+2+4=10) that is written into the sixth element in res.

The remaining elements are handled by processor 102 in the same way. Note that the value of 6 is written to both the fourth and fifth elements of the result vector; this is the "running" effect of the instruction. The value being set in this way reflects the fact that the fifth element of the vectors is not a relevant element (i.e., the fifth element of the control vector is set to zero) and so the fifth element is not used in the multiplication and summation operations for the RunningMAC2P instruction. For clarity, elements that are not written to during this operation are marked with an X in res.

In some embodiments, the call of the RunningMAC2P instruction is accompanied by a global predicate vector that may control the writing of the result into the result vector. In these embodiments, if the call to the RunningMAC2P instruction indicates that zeroing is to be used, for elements of the result vector where the predicate vector is inactive (e.g., is set to zero), the elements may be set to zero. Otherwise, if the call to the RunningMAC2P instruction indicates that predication is to be used, for elements of the result vector where the predicate vector is inactive (e.g., is set to zero), the elements may be left unchanged (i.e., whatever value was in such an element of the result vector is not overwritten with a new value).

RunningFMAC1P and RunningFMAC2P

As recited above, the described embodiments include RunningFMAC1P and RunningFMAC2P instructions. The RunningFMAC1P instruction performs similar operations to the above-described RunningMAC1P instruction, and the RunningFMAC2P instruction performs similar operations to the above-described RunningMAC2P instruction. Because similar operations are performed for the RunningFMAC1P/2P instructions, separate flowcharts are not presented for the RunningFMAC1P/2P instructions. However, as described above, processor 102 may not round the result for the multiplication for the RunningFMAC1P/2P instruction before performing the summing operation.

The foregoing descriptions have been presented only for purposes of illustration and description. They are not intended to be exhaustive or to limit the described embodiments to the forms disclosed. Accordingly, many modifications and variations will be apparent to practitioners skilled in the art. Additionally, the above disclosure is not intended to limit the described embodiments. The scope of these embodiments is defined by the appended claims.

What is claimed is:

1. A method for generating a result vector, comprising:
in a processor, performing operations for:
receiving a first input vector, a second input vector, a third input vector, and a control vector, wherein each vector includes a same number of elements;
setting a base value equal to a value from an element at a key element position in the first input vector; and
generating the result vector, wherein generating the result vector comprises:
for each element of the result vector to the right of the key element position,
setting the element in the result vector equal to a sum of the base value and each result of multiplying a value in each relevant element of the second input vector by a value in a corresponding element of the third input vector, from an element at the key element position to and including a predetermined element in the second input vector, wherein a relevant element is an element for which a corresponding element in the control vector is active.

2. The method of claim 1, wherein the key element position is a leftmost element position where the control vector is active.

3. The method of claim 2, wherein the predetermined element in the second input vector is:
a closest element in the second input vector to the left of an element in the second input vector at a same position as the element in the result vector.

4. The method of claim 3, wherein generating the result vector comprises setting an element in the result vector at the key element position equal to the base value.

5. The method of claim 4, wherein generating the result vector comprises:
for each element of the result vector to the left of the key element position, setting the element in the result vector equal to a value in a corresponding element in the first input vector;
when no key element position exists, setting each element in the result vector equal to a value in a corresponding element in the first input vector.

6. The method of claim 2, wherein the predetermined element in the second input vector is:
an element in the second input vector at a same position as the element in the result vector.

7. The method of claim 6, wherein generating the result vector comprises setting an element in the result vector at the key element position equal to a sum of the base value and a result of multiplying a value in the key element position in the second input vector by a value in a corresponding element of the third input vector.

8. The method of claim 7, wherein generating the result vector comprises:
for each element of the result vector to the left of the key element position, setting the element in the result vector equal to a value in a corresponding element in the first input vector;
when no key element position exists, setting each element in the result vector equal to a value in a corresponding element in the first input vector.

9. A processor that generates a result vector, comprising:
the processor, wherein the processor is configured to:
receive a first input vector, a second input vector, a third input vector, and a control vector, wherein each vector includes a same number of elements;
set a base value equal to a value from an element at a key element position in the first input vector; and
generate the result vector, wherein generating the result vector comprises:
for each element of the result vector to the right of the key element position,
setting the element in the result vector equal to a sum of the base value and each result of multiplying a value in each relevant element of the second input vector by a value in a corresponding element of the third input vector, from an element at the key element position to and including a predetermined element in the second input vector, wherein a relevant element is an element for which a corresponding element in the control vector is active.

10. The processor of claim 9, wherein the key element position is a leftmost element position where the control vector is active.

11. The processor of claim 10, wherein the predetermined element in the second input vector is:
a closest element in the second input vector to the left of an element in the second input vector at a same position as the element in the result vector.

12. The processor of claim 11, wherein, when generating the result vector, the processor is configured to set an element in the result vector at the key element position equal to the base value.

13. The processor of claim 12, wherein, when generating the result vector, for each element of the result vector to the left of the key element position, the processor is configured to set the element in the result vector equal to a value in a corresponding element in the first input vector;
when no key element position exists, the processor is configured to set each element in the result vector equal to a value in a corresponding element in the first input vector.

14. The processor of claim 10, wherein the predetermined element in the second input vector is:
an element in the second input vector at a same position as the element in the result vector.

15. The processor of claim 14, wherein, when generating the result vector, the processor is configured to set an element in the result vector at the key element position equal to a sum of the base value and a result of multiplying a value in the key element position in the second input vector by a value in a corresponding element of the third input vector.

16. The processor of claim 15, wherein, when generating the result vector, for each element of the result vector to the left of the key element position, the processor is configured to set the element in the result vector equal to a value in a corresponding element in the first input vector;
when no key element position exists, the processor is configured to set each element in the result vector equal to a value in a corresponding element in the first input vector.

17. A computer system that generates a result vector, comprising:
a processor; and
a memory coupled to the processor, wherein the memory stores instructions and data for the processor;
wherein the processor is configured to:
receive a first input vector, a second input vector, a third input vector, and a control vector, wherein each vector includes a same number of elements;

set a base value equal to a value from an element at a key element position in the first input vector; and
generate the result vector, wherein generating the result vector comprises:
for each element of the result vector to the right of the key element position,
setting the element in the result vector equal to a sum of the base value and each result of multiplying a value in each relevant element of the second input vector by a value in a corresponding element of the third input vector, from an element at the key element position to and including a predetermined element in the second input vector, wherein a relevant element is an element for which a corresponding element in the control vector is active.

18. The computer system of claim 17, wherein the key element position is a leftmost element position where the control vector is active.

19. The computer system of claim 18, wherein the predetermined element in the second input vector is:
a closest element in the second input vector to the left of an element in the second input vector at a same position as the element in the result vector.

20. The computer system of claim 19, wherein, when generating the result vector, the processor is configured to set an element in the result vector at the key element position equal to the base value.

21. The computer system of claim 20, wherein, when generating the result vector, for each element of the result vector to the left of the key element position, the processor is configured to set the element in the result vector equal to a value in a corresponding element in the first input vector;
when no key element position exists, the processor is configured to set each element in the result vector equal to a value in a corresponding element in the first input vector.

22. The computer system of claim 18, wherein the predetermined element in the second input vector is:
an element in the second input vector at a same position as the element in the result vector.

23. The computer system of claim 22, wherein, when generating the result vector, the processor is configured to set an element in the result vector at the key element position equal to a sum of the base value and a result of multiplying a value in the key element position in the second input vector by a value in a corresponding element of the third input vector.

24. The computer system of claim 23, wherein, when generating the result vector, for each element of the result vector to the left of the key element position, the processor is configured to set the element in the result vector equal to a value in a corresponding element in the first input vector;
when no key element position exists, the processor is configured to set each element in the result vector equal to a value in a corresponding element in the first input vector.

* * * * *